US012416888B2

(12) United States Patent
Sone et al.

(10) Patent No.: US 12,416,888 B2
(45) Date of Patent: Sep. 16, 2025

(54) IMAGE FORMING APPARATUS

(71) Applicants: Keita Sone, Tokyo (JP); Tomohide Takenaka, Kanagawa (JP); Shinya Tanaka, Kanagawa (JP); Masashi Tachi, Kanagawa (JP)

(72) Inventors: Keita Sone, Tokyo (JP); Tomohide Takenaka, Kanagawa (JP); Shinya Tanaka, Kanagawa (JP); Masashi Tachi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/653,078

(22) Filed: May 2, 2024

(65) Prior Publication Data

US 2024/0377779 A1 Nov. 14, 2024

(30) Foreign Application Priority Data

May 11, 2023 (JP) ................................ 2023-078795

(51) Int. Cl.
*G03G 15/00* (2006.01)

(52) U.S. Cl.
CPC .................. *G03G 15/5041* (2013.01); *G03G 2215/00755* (2013.01); *G03G 2215/0164* (2013.01)

(58) Field of Classification Search
CPC ........... G03G 15/5041; G03G 15/5054; G03G 15/5058; G03G 15/5062; G03G 2215/00755; G03G 2215/0164
See application file for complete search history.

(56) References Cited

U.S. PATENT DOCUMENTS

| | | | | |
|---|---|---|---|---|
| 10,389,888 | B2 * | 8/2019 | Tomii | H04N 1/6041 |
| 10,620,578 | B2 * | 4/2020 | Sakurada | G03G 15/55 |
| 2012/0294637 | A1 | 11/2012 | Tanaka et al. | |
| 2013/0156449 | A1 | 6/2013 | Fujimori et al. | |
| 2013/0236200 | A1 | 9/2013 | Tanaka et al. | |
| 2014/0270818 | A1 | 9/2014 | Tanaka et al. | |
| 2014/0294412 | A1 | 10/2014 | Tanaka et al. | |
| 2015/0362868 | A1 | 12/2015 | Sone et al. | |
| 2016/0103408 | A1 | 4/2016 | Sone et al. | |
| 2016/0246220 | A1 | 8/2016 | Sone et al. | |
| 2017/0315471 | A1 | 11/2017 | Kamihara et al. | |
| 2018/0150010 | A1 | 5/2018 | Sone et al. | |

(Continued)

FOREIGN PATENT DOCUMENTS

| | | | |
|---|---|---|---|
| JP | 2021-152598 | A | 9/2021 |
| JP | 2023-063803 | A | 5/2023 |

*Primary Examiner* — Hoang X Ngo
(74) *Attorney, Agent, or Firm* — XSENSUS LLP

(57) ABSTRACT

An image forming apparatus includes an image former, a detector, and circuitry. The image former forms a toner pattern with a first line screen; and forms a toner image based on image data, with a second line screen. The detector detects density unevenness of the toner pattern, formed by the image former, in a main scanning direction. The circuitry is configured to calculate a first correction amount from the density unevenness detected by the detector; create a gradation correction table that reduces the density unevenness based on the first correction amount; and correct the first correction amount by a second correction amount corresponding to the second line screen, in a case where the first line screen is different from the second line screen.

6 Claims, 8 Drawing Sheets

(56) References Cited

U.S. PATENT DOCUMENTS

| | | | | |
|---|---|---|---|---|
| 2019/0064719 | A1 | 2/2019 | Tachi et al. | |
| 2021/0302886 | A1* | 9/2021 | Yokote | G03G 15/5062 |
| 2021/0318651 | A1 | 10/2021 | Tachi et al. | |
| 2023/0127750 | A1 | 4/2023 | Takenaka | |
| 2023/0384725 | A1 | 11/2023 | Sone et al. | |

* cited by examiner

FIG. 6

| POSITION IN MAIN SCANNING DIRECTION | GRADATION LEVEL | | | | | | | | | | | | |
|---|---|---|---|---|---|---|---|---|---|---|---|---|---|
| | 1 | 2 | 3 | 4 | 5 | 6 | .... | 225 | 226 | 227 | 228 | 229 | 230 |
| 0 | 1 | 2 | 2 | 3 | 4 | 4 | | 225 | 226 | 227 | 228 | 229 | 230 |
| 1 | 1 | 2 | 3 | 4 | 5 | 5 | | 223 | 224 | 225 | 226 | 227 | 228 |
| 2 | 1 | 2 | 3 | 4 | 5 | 6 | | 220 | 221 | 222 | 223 | 223 | 224 |
| 3 | 1 | 2 | 3 | 4 | 5 | 6 | | 219 | 220 | 221 | 222 | 223 | 224 |
| 4 | 1 | 2 | 3 | 4 | 5 | 6 | | 219 | 220 | 221 | 222 | 223 | 224 |
| 5 | 2 | 3 | 4 | 5 | 6 | 7 | | 219 | 220 | 221 | 222 | 222 | 223 |
| 6 | 2 | 3 | 4 | 5 | 6 | 7 | | 219 | 220 | 220 | 221 | 222 | 223 |
| .... | | | | | | | | | | | | | |
| X-6 | 2 | 3 | 5 | 6 | 7 | 8 | | 225 | 226 | 227 | 228 | 229 | 230 |
| X-5 | 2 | 3 | 4 | 5 | 6 | 7 | | 225 | 226 | 227 | 228 | 229 | 230 |
| X-4 | 2 | 3 | 4 | 5 | 6 | 7 | | 227 | 228 | 229 | 230 | 230 | 231 |
| X-3 | 1 | 2 | 3 | 4 | 5 | 6 | | 228 | 229 | 230 | 231 | 232 | 232 |
| X-2 | 1 | 2 | 3 | 4 | 5 | 6 | | 229 | 230 | 231 | 232 | 233 | 233 |
| X-1 | 1 | 2 | 3 | 4 | 5 | 6 | | 229 | 230 | 231 | 232 | 233 | 234 |
| X | 1 | 2 | 3 | 4 | 5 | 5 | | 230 | 231 | 232 | 233 | 234 | 235 |

IMAGE FORMING APPARATUS

CROSS-REFERENCE TO RELATED APPLICATIONS

This patent application is based on and claims priority pursuant to 35 U.S.C. § 119 (a) to Japanese Patent Application No. 2023-078795, filed on May 11, 2023, in the Japan Patent Office, the entire disclosure of which is hereby incorporated by reference herein.

BACKGROUND

Technical Field

Embodiments of the present disclosure relate to an image forming apparatus.

Related Art

An image forming apparatus is known including an image forming unit that forms a toner image based on image data, a density unevenness detection unit that detects density unevenness in a main scanning direction of a toner pattern formed by the image forming unit, and a correction unit that corrects an image forming condition of the image forming unit so as to reduce the density unevenness based on a correction amount calculated from the detected density unevenness.

For example, an image forming apparatus is known, which detects toner patterns (measurement charts) printed by a printing unit (image forming section) with a density sensor, and detects density unevenness in the main scanning direction. In this image forming apparatus, a correction amount is determined from the detected density unevenness, and an input image signal (image data) is corrected by the correction amount at the time of image formation, thus reducing the density unevenness in the main scanning direction.

The measurement chart is formed by arranging a plurality of band images (band images extending in the main scanning direction) having different gradation levels in parallel in the sub-scanning direction. By detecting the measurement chart with the density sensor, the density differences ΔD for the respective gradation levels at each position in the main scanning direction are detected as the density unevenness in the main scanning direction for each gradation level. During image formation, the correction amount for the input image signal is determined by multiplying the density difference ΔD for each gradation level at various positions in the main scanning direction by a conversion coefficient N for each gradation level.

However, in such known image forming apparatuses, density unevenness in the main scanning direction may remain.

SUMMARY

An embodiment of the present disclosure provides an image forming apparatus includes an image former, a detector, and circuitry. The image former forms a toner pattern with a first line screen; and forms a toner image based on image data, with a second line screen. The detector detects density unevenness of the toner pattern, formed by the image former, in a main scanning direction. The circuitry is configured to calculate a first correction amount from the density unevenness detected by the detector; create a gradation correction table that reduces the density unevenness based on the first correction amount; and correct the first correction amount by a second correction amount corresponding to the second line screen, in a case where the first line screen is different from the second line screen.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 6 is a diagram of a gradation correction table;

Figure 1:
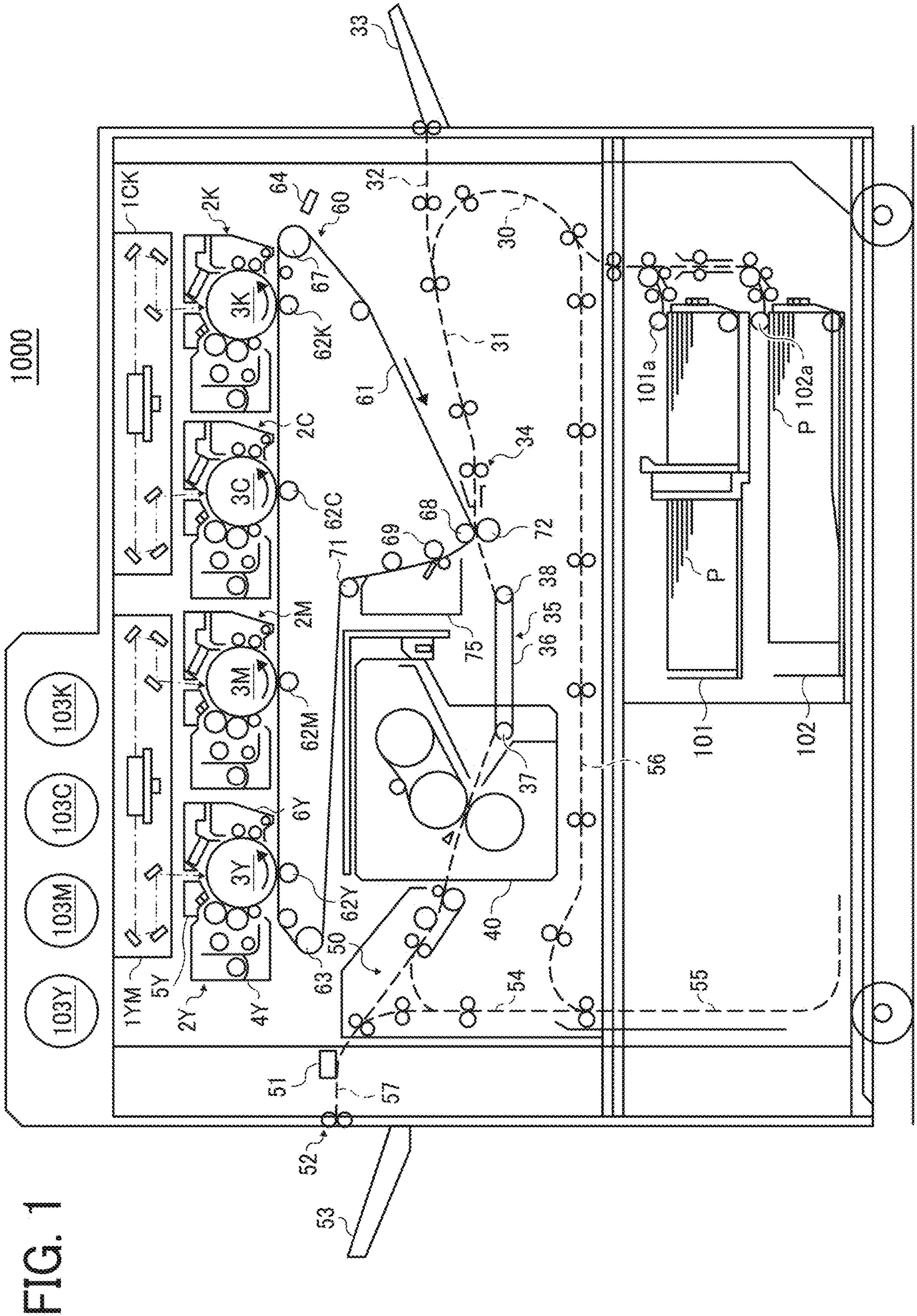
FIG. 1 is a schematic diagram of a printer according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

According to one aspect of the present disclosure, even when a toner image is formed using a screen line number different from the one used in forming toner patterns, density unevenness in the main scanning direction can be sufficiently reduced.

The following describes an embodiment of a printer that utilizes the electrophotographic method for image formation, as an image forming apparatus according to an embodiment of the present disclosure. At first, a description is given of a basic configuration of a printer according to an embodiment of the present disclosure, with reference to FIG. 1.

FIG. 1 is a diagram of a printer 1000 according to an embodiment of the present disclosure. The printer 1000 includes four process units 2Y, 2M, 2C, and 2K to form toner images of yellow (Y), magenta (M), cyan (C), and black (K). The printer 1000 further includes a sheet feed passage 30, a pre-transfer sheet conveyance passage 31, a bypass sheet feed passage 32, a bypass tray 33, a pair of registration rollers 34, and a sheet conveyance belt unit 35. The printer 1000 further includes a fixing device 40, a conveyance direction switching device 50, a pair of ejection rollers 52, a sheet ejection tray 53, a first sheet feeding tray 101, a second sheet feeding tray 102, and a re-entry device. The printer 1000 also includes two optical writing units 1YM and ICK. The process units 2Y, 2M, 2C, and 2K include drum-shaped photoconductors 3Y, 3M, 3C, and 3K, which serves as latent image carriers, respectively.

Each of the first sheet feeding tray 101 and the second sheet feeding tray 102 contains a bundle of recording sheets P that serves as recording media. The bundle of recording sheets P includes a recording sheet P that serves as a recording medium. The first sheet feeding tray 101 includes a sheet feed roller 101*a*, and the second sheet feeding tray 102 includes a sheet feed roller 102*a*. An uppermost recording sheet P that is placed on top of the bundle of recording sheets P is fed by rotation of a selected one of the sheet feed rollers 101*a* and 102*a* toward the sheet feed passage 30. The sheet feed passage 30 leads to the pre-transfer sheet conveyance passage 31 that extends to a secondary transfer nip region. The recording sheet P passes through the pre-transfer sheet conveyance passage 31 immediate before the secondary transfer nip region. After being fed from a selected one of the first sheet feeding tray 101 and the second sheet feeding tray 102, the recording sheet P passes through the sheet feed passage 30 and enters the pre-transfer sheet conveyance passage 31.

In addition, the printer 1000 further includes a housing in which parts and components for image formation are contained. The bypass tray 33 is disposed openably and closably on a side of the housing of the printer 1000 in FIG. 1. The bundle of recording sheets P is loaded on a top face of the bypass tray 33 when the bypass tray 33 is open with respect to the housing. The uppermost recording sheet P placed on top of the bundle of recording sheets P is fed toward the pre-transfer sheet conveyance passage 31 by the sheet feed roller of the bypass tray 33.

Each of the optical writing units 1YM and ICK, which exposes the surface of the photoconductor to form an electrostatic latent image on the surface of the photoconductor, includes a laser diode, a polygon mirror, and various lenses. Each of the optical writing devices 1YM and ICK drives the laser diode based on image data of an image that is transmitted from a personal computer. The optical writing units 1YM and ICK drive laser diodes as light sources based on image signals read by a scanner outside the printer or image signals sent from a personal computer. Then, the photoconductors 3Y, 3M, 3C, and 3K of the process units 2Y, 2M, 2C, and 2K are optically scanned. Specifically, the photoconductors 3Y, 3M, 3C, and 3K of the process units 2Y, 2M, 2C, and 2K are rotationally driven in the counterclockwise direction in FIG. 1. The optical writing device 1YM emits laser light beams to the photoconductors 3Y and 3M while the photoconductors 3Y and 3M are driving, by deflecting the laser light beams in an axial direction of rotation of the photoconductors 3Y and 3M. As a result, the surfaces of the photoconductors 3Y and 3M are optically scanned and irradiated. Thus, the electrostatic latent image based on the yellow and magenta image data are formed on the photoconductor 3Y and 3M. The optical writing device 1CM emits laser light beams to the photoconductors 3C and 3K while the photoconductors 3Y and 3M are driving, by deflecting the laser light beams in an axial direction of rotation of the photoconductors 3C and 3K. As a result, the surfaces of the photoconductors 3C and 3K are optically scanned and irradiated. Thus, the electrostatic latent image based on the cyan and black image data are formed on the photoconductor 3C and 3K.

Each of the process units 2Y, 2M, 2C, and 2K includes, as a single unit, a corresponding one of the photoconductors 3Y, 3M, 3C, and 3K as laten image carriers and components disposed around the corresponding one. The process units 2Y, 2M, 2C, and 2K are detachably attached to the housing of the printer 1000. The photoconductors 3Y, 3M, 3C, and 3K for forming yellow, magenta, cyan, and black toner images have substantially identical configurations to each other, except that the colors of toners to be used for forming respective color toner images are different from each other. The process unit 2 (i.e., the process units 2Y, 2M, 2C, and 2K) includes the photoconductor 3 (i.e., the photoconductor 3Y, 3M, 3C, and 3K) and a developing device 4 (i.e., developing devices 4Y, 4M, 4C, and 4K) that develops an electrostatic latent image formed on a surface of the photoconductor 3 into a visible toner image. The process unit 2 (i.e., the process units 2Y, 2M, 2C, and 2K) further includes a charging device 5 (i.e., charging devices 5Y, 5M, 5C, and 5K) and a drum cleaning device 6 (i.e., drum cleaning devices 6Y, 6M, 6C, and 6K). The charging device 5 uniformly charges the surface of the photoconductor 3 (i.e., the photoconductors 3Y, 3M, 3C, and 3K) while the photoconductor 3 is rotating. The drum cleaning device 6 removes transfer residual toner remaining on the surface of the photoconductor 3 after passing a primary transfer nip region and cleans the surface of the photoconductor 3.

The printer 1000 illustrated in FIG. 1 is a tandem image forming apparatus in which the four process units 2Y, 2M, 2C, and 2K are aligned along a direction of movement of an intermediate transfer belt 61 that functions as a driven target body having an endless loop.

The photoconductor 3 (i.e., the photoconductors 3Y, 3M, 3C, and 3K) is manufactured by a hollow tube made of aluminum, for example, with the front face covered by an organic photoconductive layer having photosensitivity. Each of the photoconductors 3Y, 3M, 3C, and 3K may include an endless belt.

The developing device 4 (i.e., developing devices 4Y, 4M, 4C, and 4K) develops an electrostatic latent image by a two-component developer including magnetic carrier particles and non-magnetic toner. In the following description, the two-component developer is simply referred to as a "developer". A toner supplier replenishes corresponding color toner to a toner bottle 103 (i.e., toner bottles 103Y, 103M, 103C, and 103K). A toner concentration detector is disposed in the developing device 4 (i.e., developing devices 4Y, 4M, 4C, and 4K). The toner density detector detects magnetic permeability caused by the carrier which is a magnetic material, and calculates the concentration of the toner from the amount of the carrier contained in a certain volume. The toner concentration in the developing device is detected by the toner concentration detector, and the toner concentration in the developing device is controlled to be within a certain range (for example, 5 wt % to 9 wt %).

In the present embodiment, the drum cleaning device 6 (i.e., the drum cleaning devices 6Y, 6M, 6C, and 6K) employs a method of pressing a cleaning blade 16 made of a polyurethane rubber pressed against the photoconductor 4. However, in some embodiments, any other suitable cleaning method may be used. In order to enhance the cleaning performance, the printer 1000 employs a rotatable fur brush to contact the photoconductor 3. This fur brush scrapes a solid lubricant into powder and applies the lubricant powder to the surface of the photoconductor 3.

An electric discharging lamp is disposed above the photoconductor 3. The electric discharging lamp is also included in the process unit 2. Further, the electric discharging lamp optically emits light to the photoconductor 3 to remove electricity from the surface of the photoconductor 3 after passing through the drum cleaning device 6. The electrically discharged surface of the photoconductor 3 is uniformly charged by the charging device 5. Then, the above-described optical writing device 1YM starts optical scanning. It is to be noted that the charging device 5 rotates while receiving the charging bias from a power source. Instead of this configuration, the charging device 5 can employ a scorotron charging system in which a charging operation is performed without contacting the photoconductor 3. As described above with FIG. 1, the process units 2Y, 2M, 2C, and 2K have an identical configuration to each other.

The transfer unit 60 is disposed below the process units 2Y, 2M, 2C, and 2K. The transfer unit 60 causes the intermediate transfer belt 61 that is an endless belt wound around multiple support rollers (including rollers 63, 67, 68, 69, and 71) with tension to contact the photoconductors 3Y, 3M, 3C, and 3K. While causing the intermediate transfer belt 61 to be in contact with the photoconductors 3Y, 3M, 3C, and 3K, the intermediate transfer belt 61 is rotated by rotation of one of the multiple support rollers so that the intermediate transfer belt 61 endlessly moves in a clockwise direction. Thus, primary transfer nips for Y, M, C, and K are formed where the photoconductors 3Y, 3M, 3C, and 3K and the intermediate transfer belt 61 are in contact with each other.

In proximity to each of the primary transfer nip regions for black, yellow, magenta, and cyan images, the primary transfer rollers 62 (i.e., the primary transfer rollers 62K, 62Y, 62M, and 62C) are disposed in contact with the inner loop of the intermediate transfer belt 61 to press the intermediate transfer belt 25 against the photoconductors 4 (i.e., the photoconductors 4K, 4Y, 4M, and 4C), respectively. A primary transfer bias is applied by respective transfer bias power supplies to the primary transfer rollers 62Y, 62M, 62C, and 62K. Consequently, respective primary transfer electric fields are generated in the primary transfer nip regions to electrostatically transfer respective toner images formed on the photoconductors 3Y, 3M, 3C, and 3K onto the intermediate transfer belt 61.

Figure 2:
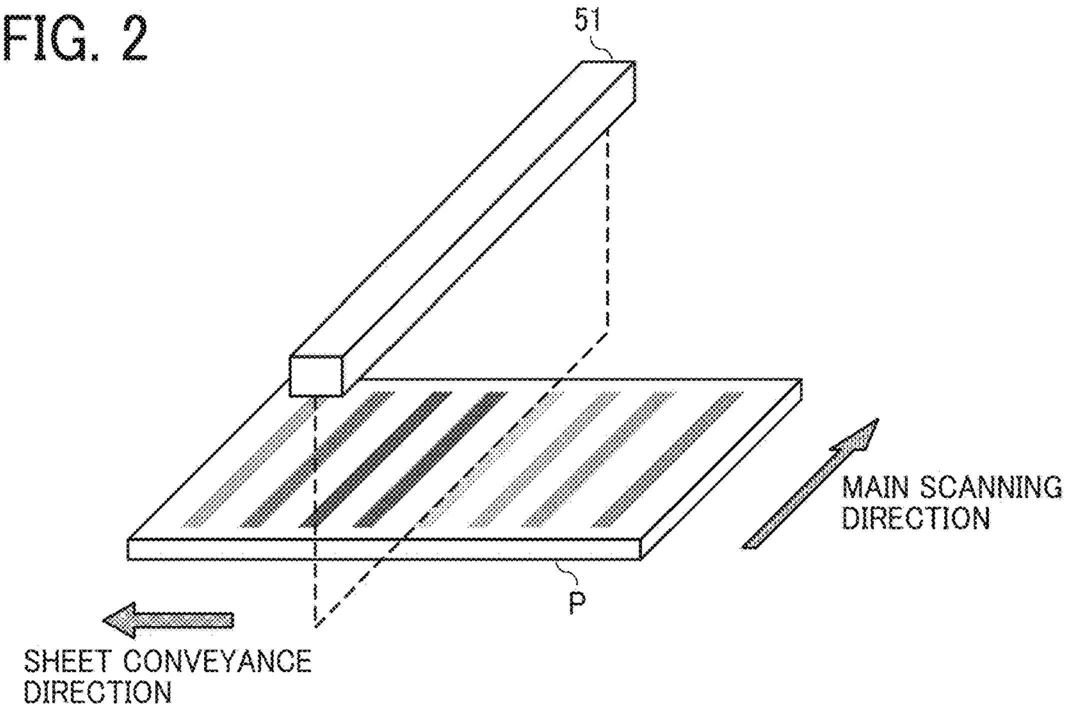
FIG. 2 is a perspective view of a density sensor in the printer in FIG. 1.

As the intermediate transfer belt 61 passes through the primary transfer nip regions along the endless rotation in the clockwise direction in FIG. 2, the black, yellow, magenta, and cyan toner images are sequentially transferred at the primary transfer nip regions and overlaid onto an outer circumferential surface of the intermediate transfer belt 61. Due to the primary transfer of the toner images, a four-color composite toner image (referred to as a four-color toner image) is formed on the surface of the intermediate transfer belt 61.

The secondary transfer roller 72 positioned below the intermediate transfer belt 61 in FIG. 1 contacts a secondary transfer backup roller 68 at a position where the secondary transfer roller 72 faces the secondary transfer backup roller 68 via the outer surface of the intermediate transfer belt 61, which forms a secondary transfer nip region. As a result, a secondary transfer nip is formed at which the secondary transfer roller 72 contacts the outer surface of the intermediate transfer belt 61.

A secondary transfer bias is applied by a transfer bias power supply to the secondary transfer roller 72. By contrast, the secondary transfer backup roller 68 disposed inside the belt loop of the intermediate transfer belt 61 is electrically grounded. By so doing, a secondary transfer electric field is formed in the secondary transfer nip region.

The pair of registration rollers 34 is disposed on the right side of the secondary transfer nip region in FIG. 1. The pair of registration rollers 34 holds and conveys the recording sheet P to the secondary transfer nip region in synchronization with arrival of the four-color toner image formed on the intermediate transfer belt 61 so as to further convey the recording medium P toward the secondary transfer nip region. In the secondary transfer nip region, the four-color toner image formed on the intermediate transfer belt 61 is transferred onto the recording sheet P due to the secondary transfer electric field and a nip pressure. At this time, the four-color toner image is combined with white color of the recording sheet P to make a full-color toner image.

A sensor 64, which is a reflective optical sensor that detects the amount of toner adhered, is disposed between the primary transfer nip K and the secondary transfer nip. A reflective optical sensor includes a light-emitting element and a light-receiving element. Light emitted from the light-emitting element is directed onto a toner patch on the intermediate transfer belt 61. This light is then reflected back from the toner patch and captured by the light-receiving element, subsequently being converted into a signal. The information of the test pattern is analogized by reading the change in the signal, and the amount of adhesion of the toner patch is detected.

Non-transferred residual toner, which has not transferred onto the recording sheet P at the secondary transfer nip, adheres to the outer surface of the intermediate transfer belt 61 having passed the secondary transfer nip. The transfer residual toner is cleaned by a belt cleaning device 75 that is in contact with the intermediate transfer belt 61.

The recording sheet P that has passed through the secondary transfer nip region separates from the intermediate transfer belt 61 to be conveyed to the transfer belt unit 35. The sheet conveyance belt unit 35 includes a transfer belt 36, a drive roller 37, and a driven roller 38. The transfer belt 36 having an endless belt is wound around the drive roller 37 and the driven roller 38 with taut and is endlessly rotated in the counterclockwise direction in FIG. 1 along with rotation of the drive roller 37. While nipping the recording sheet P that is conveyed from the secondary transfer nip region on the outer circumferential surface (the stretched surface) of the transfer belt 36, the sheet conveyance belt unit 35 forwards the recording sheet P along with the endless rotation of the transfer belt 36 toward the fixing device 40.

The recording sheet P that has passed through the secondary transfer nip is sent into the fixing device 40 and is nipped in the fixing nip. Then, the toner image is fixed by the action of pressure and heat. The recording sheet P, on the first side of which the toner image has been transferred at the secondary transfer nip and on which the toner image has been fixed by the fixing device 40, is sent out toward the conveyance direction switching device 50.

The printer 1000 further includes a sheet reversing device including the conveyance direction switching device 50, a re-entry passage 54, a switchback passage 55, and a post-switchback passage 56. Specifically, after receiving the recording sheet P from the fixing device 40, the conveyance direction switching device 50 switches a direction of conveyance of the recording sheet P, in other words, a direction in which the recording sheet P is further conveyed, between the sheet ejection passage 57 and the re-entry passage 54. When printing an image on a first face of the recording sheet P and not printing on a second face, a single-side printing mode is selected. When performing a print job in the single-side printing mode, a route of conveyance of the recording sheet P is set to the sheet ejection passage 57. According to the setting, the recording sheet P having the image on the first face is conveyed toward the pair of sheet ejecting rollers 52 via the sheet ejection passage 57 to be ejected to the sheet ejection tray 53 that is attached to an outside of the image forming apparatus 200. When printing images on both first and second faces of a recording sheet P, a duplex printing mode is selected. When performing a print job in the duplex printing mode, after the recording sheet P having fixed images on both first and second faces is conveyed from the fixing device 40, a route of conveyance of the recording sheet P is set to the sheet ejection passage 57. According to the setting, the recording sheet P having images on both first and second faces is conveyed and ejected to the sheet ejection tray 53. By contrast, when performing a print job in the duplex printing mode, after the recording sheet P having a fixed image on the first face is conveyed from the fixing device 40, a route of conveyance of the recording sheet P is set to the re-entry passage 54.

The re-entry passage 54 is connected to the switchback passage 55. The recording sheets P conveyed to the re-entry passage 54 enters the switchback passage 55. Consequently, when the entire region in the sheet conveying direction of the recording sheet P enters the switchback passage 55, the direction of conveyance of the recording sheet P is reversed, so that the recording sheet P is switched back in the reverse direction. The switchback passage 55 is connected to the post-switchback passage 56 as well as the re-entry passage 54. The recording sheet P that has been switched back in the reverse direction enters the post-switchback passage 56. Accordingly, the faces of the recording sheet P is reversed upside down. Consequently, the reversed recording sheet P is conveyed to the secondary transfer nip region again via the post-switchback passage 56 and the sheet feed passage 30. A toner image is transferred onto the second face of the recording sheet P in the secondary transfer nip region. Thereafter, the recording sheet P is conveyed to the fixing device 40 so as to fix the toner image to the second face of the recording sheet P. Then, the recording sheet P passes through the conveyance direction switching device 50 and the pair of sheet ejecting rollers 52 before being ejected on the sheet ejection tray 53. A density sensor 51 as a detector that detects the density of an image on the recording sheets P is disposed upstream from the pair of ejection rollers 52, and detects the image density on the recording sheet P during an adjustment operation described later.

The following describes the density sensor 51 as a density-unevenness detector or an image density detector.

FIG. 2 is a perspective view of the density sensor 51. The density sensor 51 is elongated in the main scanning direction. The density sensor 51 includes an image sensor having a shape elongated in the main scanning direction. The density sensor 51 is sometimes referred to as a line sensor. The detection width of the density sensor 51 in the main scanning direction is a width indicated by a broken line in the main scanning direction in FIG. 2. The detection width is longer than the width of the recording sheet P in the main scanning direction. Accordingly, when the recording sheet P is conveyed so as to pass through the width indicated by the broken line in the main scanning direction, the image density can be detected over the entire area of the recording sheet P.

Figure 3:
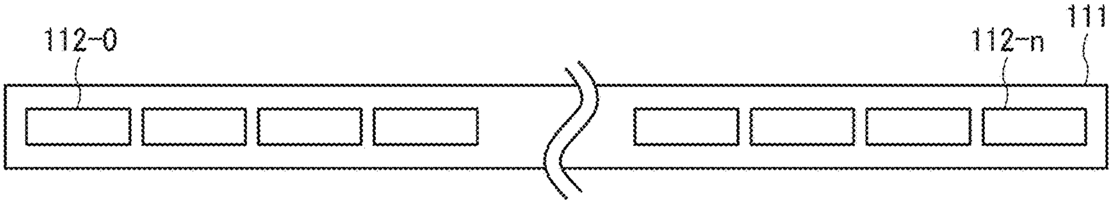
FIG. 3 is an illustration of a configuration of an image sensor included in the density sensor in FIG. 2.

FIG. 3 is an illustration of a configuration of an image sensor 111 included in the density sensor 51 in FIG. 2.

As illustrated in FIG. 3, the image sensor 111 has a shape extending in the main scanning direction, and includes small light-receiving elements 112-0 to **112-*n* (hereinafter referred to as light-receiving elements 112 unless distinguished from each other) arranged side by side in the main scanning direction. The range in which the light-receiving elements 112 are arranged is the detection width of the density sensor 51** in the main scanning direction.

Figure 4:
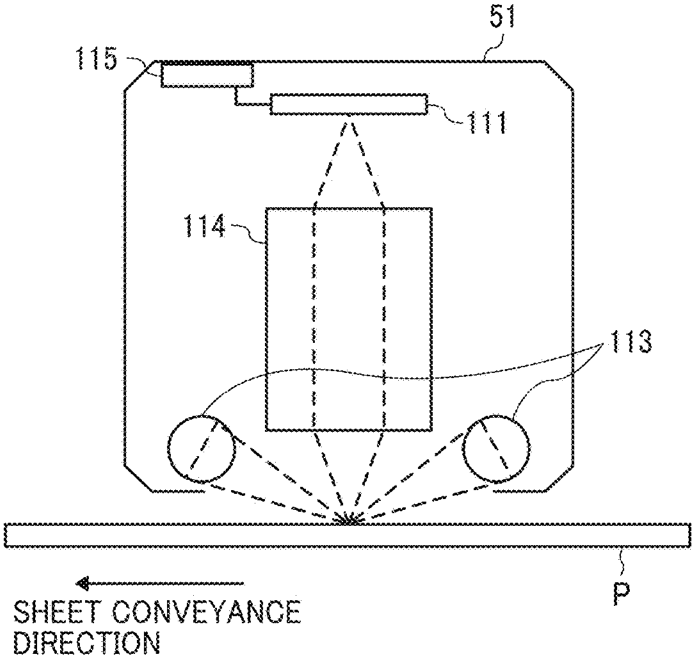
FIG. 4 is a cross-sectional view of a density sensor in a direction perpendicular to the main scanning direction.

FIG. 4 is a cross sectional view of the density sensor 51 in a direction perpendicular to the main scanning direction.

As illustrated in FIG. 4, the density sensor 51 includes an image sensor 111, a light source 113, a lens array 114, and an output circuit 115. Broken lines represent beams emitted from the light source 113.

As the light source 113, a light source provided with a light-emitting element at an end portion of a light guide body, or an LED array may be used. The light source 113 emits RGB light. As the lens array 114, for example, a SELFOC (registered trademark) lens is used.

The light emitted from the light source 113 is reflected on the recording sheets P and is imaged by the lens array 114. The image sensor 111 receives the light imaged by the lens array 114 by each light-receiving element 112 illustrated in FIG. 3, and outputs a signal corresponding to the received light. A complementary metal oxide semiconductor (CMOS) sensor or a charge-coupled device (CCD) sensor, for example, may be used as the image sensor 111.

The output circuit 115 includes, for example, an application specific integrated circuit (ASIC), and converts the signal from each light-receiving element 112 on the image sensor 111 into data indicating image density corresponding to the position of an image pattern on the recording sheets P and outputs the data. For example, 0 to 255 gradations represented by 8 bits are output. An image-free state is presented as 0 gradation whereas a solid image is represented as 255 gradations.

In the electrophotographic image forming apparatus of the present embodiment, an image is formed on the recording sheet P through multiple processes such as a developing process, a transfer process, and a fixing process. The developing process is a process in which the photoconductor 3 is uniformly charged, a latent image is formed by optical scanning using the optical writing unit 1, and toner supplied from the developing device 4 adheres to the latent image to develop the latent image. The transfer process includes a first transfer process of transferring the toner image on the photoconductor to the intermediate transfer belt and a second transfer process of transferring the toner image from the intermediate transfer belt to the recording sheet. The fixing process is a process of fixing the toner image on the recording sheet to the recording paper P by the fixing device 40.

In each of these processes, variations in mechanical precision and supply characteristics can lead to deviations in the charging of the photoconductor, gaps between the photoconductor and the developing roller of the developing device, and variations in transfer pressure along the main scanning direction, which is the axial direction of the photoconductor. These deviations cause variations in image density (hereinafter referred to as density unevenness) in the main scanning direction.

Figure 5:
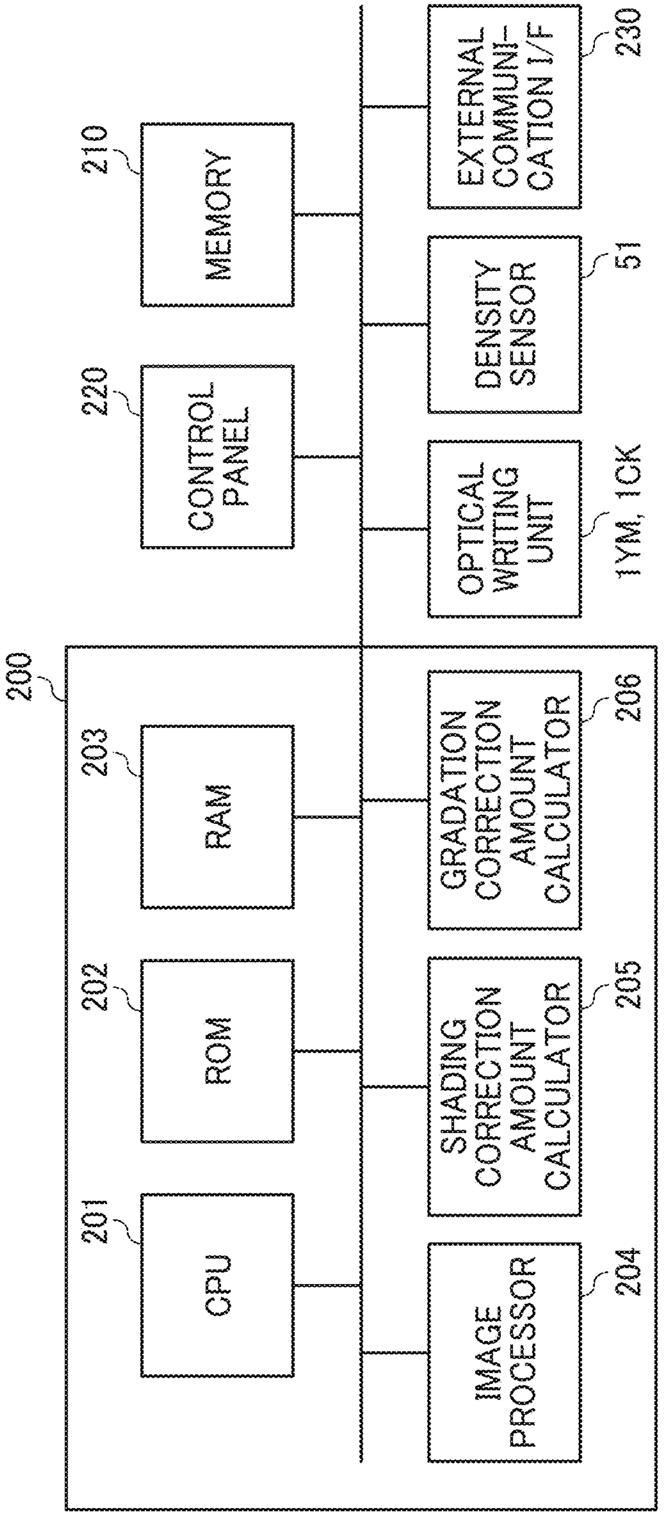
FIG. 5 is a control block diagram for density adjustment control in the main scanning direction according to an embodiment of the present disclosure.

FIG. 5 is a control block diagram for density adjustment control in the main scanning direction according to the present embodiment.

A controller 200 serves as a density-unevenness detector and a correction unit and includes a central processing unit 201, read-only memory (ROM) 202, a random-access memory (RAM) 203, an image processor 204, a shading correction amount calculator 205, and an image-data correction amount calculator. The optical writing units 1YM and ICK, the density sensor 51, the control panel 220, a memory 210, and the external communication interface (I/F) 230 are connected to the controller 200.

The CPU 201 controls the operation of the printer. Specifically, the CPU 201 executes a program stored in the ROM 202 using the RAM 203 as a work area, controlling the entire operation of the printer 1000 and implementing various functions such as printing function.

The ROM 202 is a nonvolatile memory that can retain information even when the power is turned off. The RAM 203 is a volatile semiconductor memory that temporarily stores programs or data The shading correction amount calculator 205 obtains density unevenness data in the main scanning direction based on the detection results of the density sensor 51, and calculates a shading correction amount based on the density unevenness data.

The calculated shading correction amount is stored in the memory 210. The gradation correction amount calculator 206 serves as a density-unevenness detector and a correction unit, obtains density unevenness data in the main scanning direction based on the detection results of the density sensor 51, and corrects the gradation level based on the density unevenness data. The gradation correction amount calculator 206 calculates the gradation correction amount for each gradation level equal to or lower than the specified gradation, and creates a gradation correction table as illustrated in FIG. 6 based on the gradation correction amount. The created gradation correction table is stored in the memory 210. In the present embodiment, the specified gradation is 230 gradations.

In the present embodiment, only shading correction is performed for gradations exceeding the specified gradation (i.e., 230 gradations), and both shading correction and gradation correction are performed for gradations at or below the specified gradation. In the present embodiment, gradations exceeding 230 gradations are defined as high gradations, and gradations at or below 230 gradations are considered middle gradations (halftone) or less. The specified gradation, which differentiates "high gradations," where only shading correction is performed from "middle gradations" or lower, where both shading and gradation corrections are applied, can be appropriately set according to the characteristics of the device.

The image processor 204 performs image processing such as conversion into a pseudo halftone image on an image received from a scanner or a personal computer outside the printer via the external communication I/F 230, and converts the image into an image writable by the optical writing unit. The image processor 204 performs gradation correction for each area in the main scanning direction based on the gradation correction table stored in the memory 210 for an image portion having a gradation equal to or lower than the specified gradation.

The image processor 204 selects the number of screen lines in accordance with a user instruction or a selection condition such as input image data or the type of recording sheet, and performs image processing for converting the image data into a pseudo gradation image. In normal printing, the default line screen is typically used. However, for specific purposes such as enhancing the reproduction of thin lines or small text, a screen line count higher than the default may be chosen. Conversely, to improve dot stability, a line screen lower than the default might be selected.

The memory 210 is configured by a flash memory such as an HDD or an SDD, and stores shading correction amounts and a gradation correction table.

The external communication I/F 230 is an interface for connecting to a network such as the Internet or a local area network (LAN). The external communication I/F 230 can receive a print instruction, an image, and the like from an external apparatus such as a scanner or a personal computer.

The operation panel 220 receives various inputs corresponding to operation by an operation (or user) and displays various types of information such as information indicating the operation received, information indicating the operational status of the printer 1000, and information indicating the setting of the printer 1000. In one example, the operation panel 220 is, but not limited to, a liquid crystal display (LCD) having a touch panel function. However, the display device is not limited to this. For another example, the operation panel 220 may include an organic electroluminescence (EL) display functioning as the touch panel. In addition to or instead of the above-described operation panel 220, an operation device such as a hardware key or a display device such as a lamp may be provided.

Figure 7:
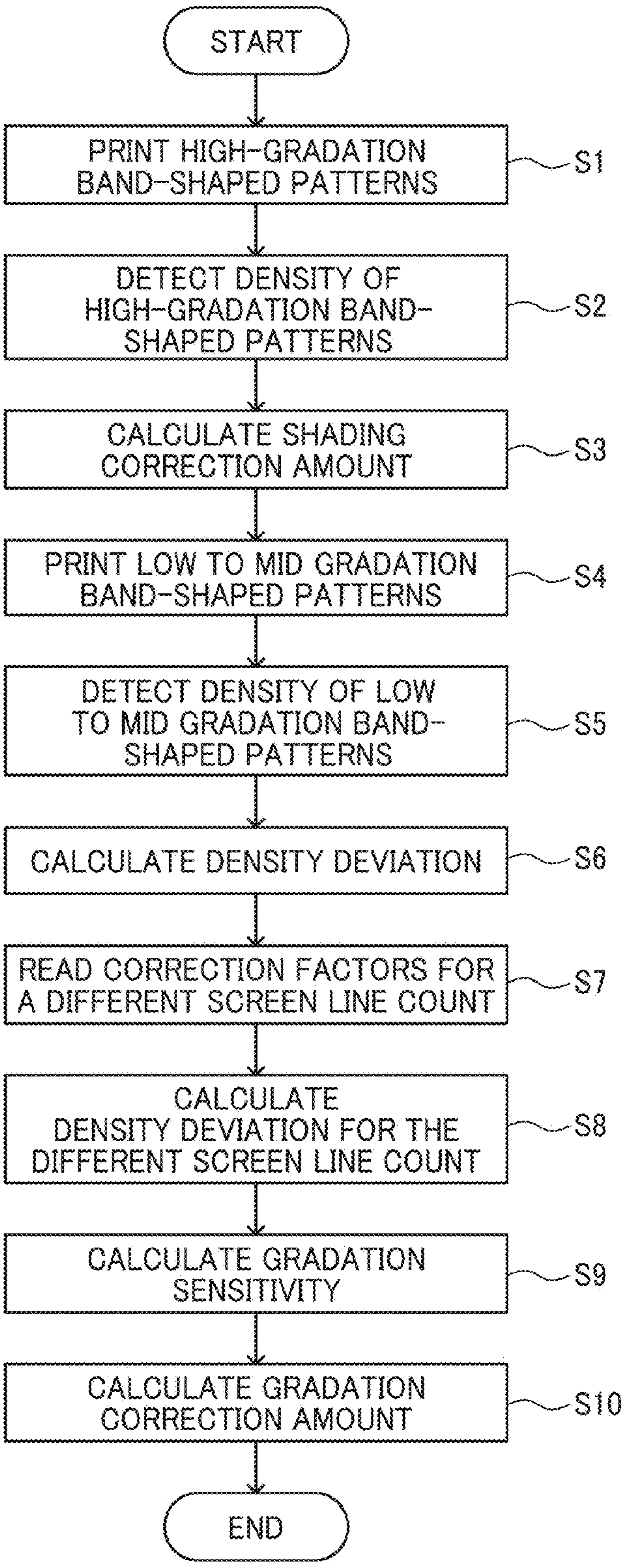
FIG. 7 is a flowchart of density adjustment control in the main scanning direction according to an embodiment of the present disclosure.

FIG. 7 is a flow chart of density adjustment control in the main scanning direction according to the present embodiment.

The density adjustment control in the main scanning direction is executed by the user operating the control panel 220. Further, the device may automatically execute density adjustment control in the main scanning direction either upon power-on or after a specified number of pages have been printed.

When the density adjustment control in the main scanning direction is executed, first, the controller 200 performs shading correction. More specifically, the controller 200 causes printing of a high-gradation band-shaped pattern of yellow, magenta, cyan, and black on the recording sheets P in step S1 (S1). The gradation of the high-gradation band-shaped pattern exceeds the specified gradation (230 gradations), which is, for example, set to the image density of a substantially middle gradation (243 gradations) between 230 and 255 gradations (243 gradations).

The image density at each position in the main scanning direction of the high-gradation band-shaped patterns of yellow, magenta, cyan, and black formed on the recording sheet P is detected by the density sensor 51 to acquire the density unevenness in the main scanning direction in step S2 (S2). Next, the shading correction amount calculator 205 of the controller 200 calculates the shading correction amount to adjust each of the optical writing units 1YM and ICK based on the acquired density unevenness in the main scanning direction in step S3 (S3). Specifically, based on the density unevenness in the main scanning direction of the high-gradation band-shaped pattern of yellow, the shading correction amount calculator 205 calculates the shading correction amount to correct the laser light quantity or laser intensity of a laser diode for the yellow color, which is included in the optical writing unit 1YM and emits a laser beam to the photoconductor 3Y. Similarly, based on the density unevenness in the main scanning direction of the high-gradation band-shaped pattern of magenta, the shading correction amount calculator 205 calculates the shading correction amount to correct the laser light quantity or laser intensity of a laser diode for the magenta color in the optical writing unit 1YM. Further, based on the density unevenness in the main scanning direction of the high-gradation band-shaped pattern of cyan, the shading correction amount calculator 205 calculates the shading correction amount to correct the laser light quantity or laser intensity of a laser diode for the cyan color in the optical writing unit ICK. Further, based on the density unevenness in the main scanning direction of the high-gradation band-shaped pattern of black, the shading correction amount calculator 205 calculates the shading correction amount to correct the laser light quantity or laser intensity of a laser diode for the black color in the optical writing unit ICK.

The calculated shading correction amount for each color is stored in the memory 210. When printing, the shading correction amount for each color is read from the memory 210, and a latent image is formed on the photoconductor by the laser light quantity corrected based on the shading correction amount.

In the present embodiment, since the shading correction is performed through the creation of a high-gradation band-shaped pattern, the shading correction amount calculated by the shading correction amount calculator 205 is designed to address the density unevenness in the main scanning direction for the high gradations. Thus, when applying this shading correction amount and printing the image areas of low, mid, and high gradations, the density unevenness in the main scanning direction for the high-gradation image areas is appropriately eliminated, but the density unevenness in the main scanning direction remains in the image areas of low to mid gradations. To deal with the density unevenness in the main scanning direction for low to mid gradations, gradation correction is performed to correct image data.

Figure 8:
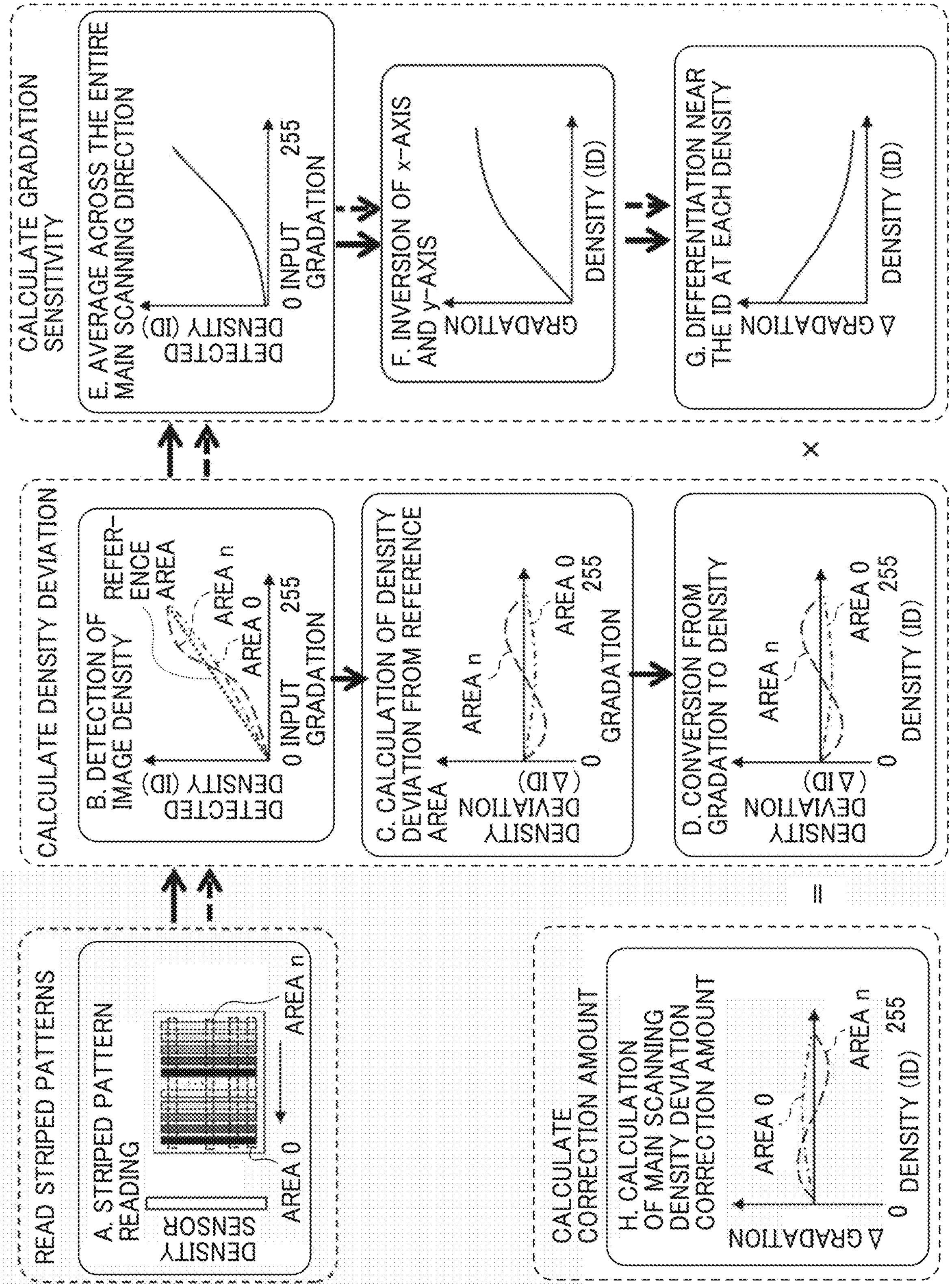
FIG. 8 is a diagram of gradation correction according to an embodiment of the present disclosure.

FIG. 8 is a diagram of gradation correction according to an embodiment of the present disclosure.

In the gradation correction, after the shading correction is performed (S1 to S3), multiple band-shaped patterns (toner patterns) with different gradations from each other are printed on the recording sheet P, all of which are below the specified gradation (230 gradations) for the yellow, magenta, cyan, and black colors (S4). The multiple band-shaped patters for the colors are formed by correcting the laser light quantity with the shading correction amount calculated by the shading correction.

Figure 9:
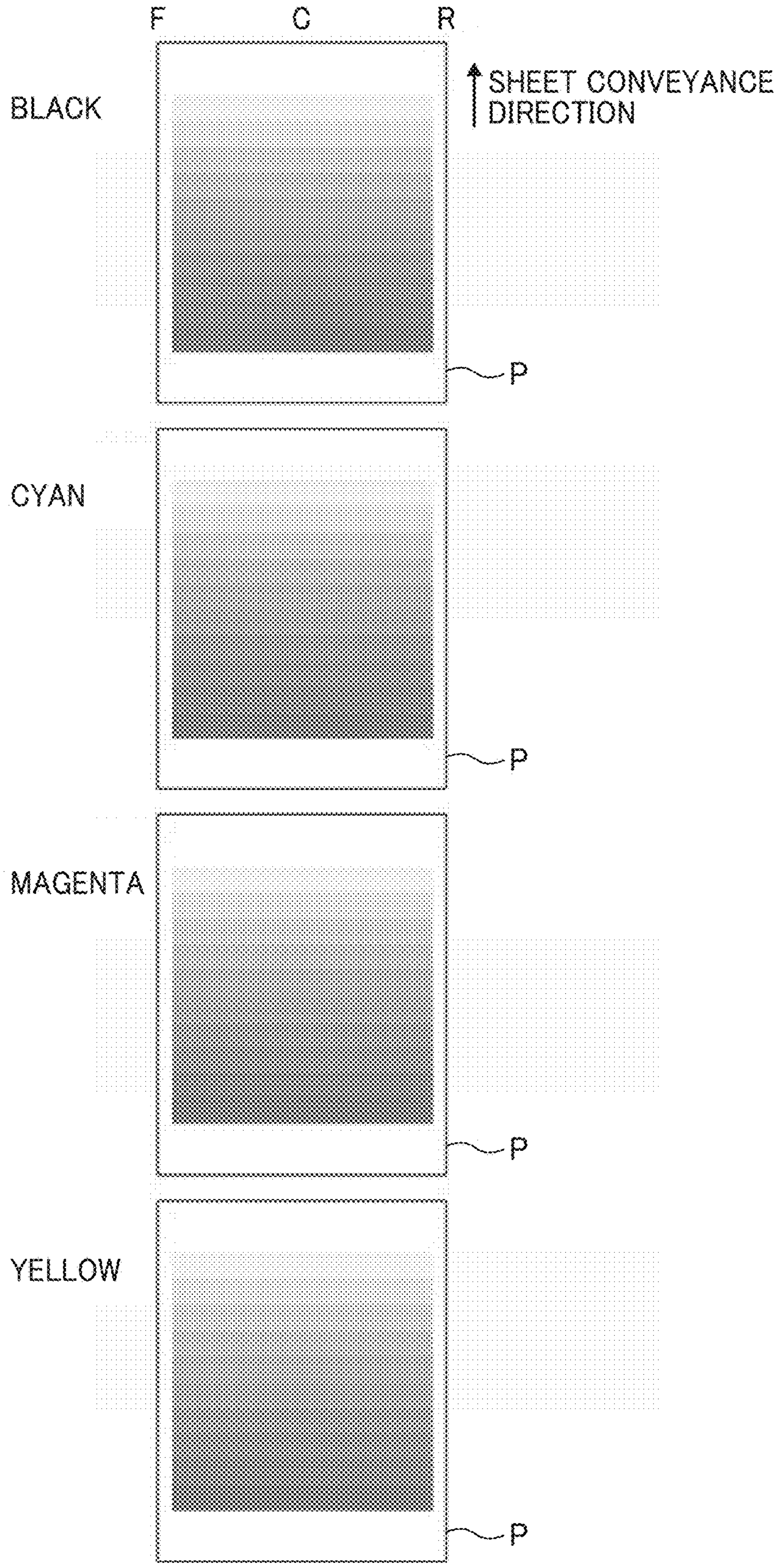
FIG. 9 is a diagram of band-shaped patterns for correcting image data according to an embodiment of the present disclosure.

FIG. 9 is a diagram of band-shaped patters for correcting image data according to an embodiment of the present disclosure.

In the present embodiment, a band-shaped pattern of one color is printed on one recording sheet P. In the present embodiment, eleven band-shaped patterns having different gradations are formed on one recording sheet P. Multiple band-shaped patterns are formed so that the number of gradations increases by 20 from downstream to upstream in the direction of feed of sheet.

In the present embodiment, for one color, band-shaped patterns of 20 gradations, 40 gradations, 60 gradations, 80 gradations, 100 gradations, 120 gradations, 140 gradations, 160 gradations, 180 gradations, 200 gradations, and 220 gradations are printed. The number of band-shaped patterns formed on one recording sheet and the gradation of each of the band-shaped patterns may be appropriately set.

Subsequently, the density sensor 51 detects the image density at each position in the main scanning direction for multiple band-shaped patterns of the yellow, magenta, cyan, and black colors formed on four recording sheets P, and acquires image densities for multiple areas in the main scanning direction for each color gradation in step S2 (S2). In other words, a process of reading the band-shaped patterns in step A of FIG. 8.

The areas along the main scanning direction (area 0 to area n) result from dividing a band-shaped pattern extending in the main scanning direction into multiple sections. The number of sections (n−1) is set as appropriate. The density sensor 51 detects the image densities of the areas along the main scanning direction for multiple band-shaped patterns with different gradations for each color. Thus, for each color and each of its gradations, a set of image densities of areas along the main scanning direction is acquired as density unevenness data of each gradation of that color. In the present embodiment, for each color, a relation is established between eleven gradations, i.e., 20, 40, 60, 80, 100, 120, 140, 160, 180, 200, and 220, and the density unevenness in the main scanning direction. The density unevenness data in the main scanning direction for the gradations other than the 11 gradations is complemented using, for example, an approximate formula.

Next, the gradation correction amount calculator 206 of the controller 200 calculates the gradation correction amount for each gradation equal to or lower than the specified gradation (230 gradations) based on 11 density unevenness in the main scanning direction acquired for each color. The gradation correction amount can be determined using only the density unevenness data in the main scanning direction. However, in the present embodiment, not only using the density unevenness data in the main scanning direction but also using gradation sensitivity data for each area along the main scanning direction will be described as an example of calculating the gradation correction amount.

The gradation sensitivity data is used because the gradation correction amount per unit of image density varies depending on the image density itself. In the following description, the processing content for each color is substantially the same, the description of differences between colors will be omitted.

In the calculation of the gradation correction amount in the present embodiment, the gradation correction amount calculator 206 performs a density deviation calculation processing from step B to D in FIG. 8 (S6). Specifically, as described in step B of FIG. 8, the gradation correction amount calculator 206 obtains, from the density unevenness data in the main scanning direction for each gradation, data on the relation between gradation and image density for each area along the main scanning direction (area 0 to area n). Next, the gradation correction amount calculator 206 reads out, from the memory 210, reference area data indicating the target image densities for the gradations in each area along the main scanning direction. After that, the gradation correction amount calculator 206 calculates the density deviation ΔID across all the gradations, for each area (area 0 to area n) along the main scanning direction, which is the difference between the image density based on the density unevenness data along the main scanning direction and the target image density of the reference area data. Thus, the relation between the gradation and the density deviation Δ ID for each of the areas in the main scanning direction (area 0 to area n) is obtained. Finally, the gradation correction amount calculator 206 converts the gradation into the image density ID using the reference area data, and acquires the relation between the image density ID and the density deviation ΔID for each of the areas along the main scanning direction areas (area 0 to area n) as illustrated in step D of FIG. 8.

In the calculation of the gradation correction amount in the present embodiment, the gradation correction amount calculator 206 performs a gradation sensitivity calculation processing from step E to G in FIG. 8 (S9). Specifically, as described in step E of FIG. 8, the gradation correction amount calculator 206 calculates, from the above-described density unevenness data in the main scanning direction, the average image density for each gradation. By calculating the average image density for each gradation, the correlation between the image density ID and the gradation is obtained. The correlation between the image density ID and the gradation can be represented by an approximate formula, as illustrated in step F of FIG. 8. Then, by differentiating the approximate formula in the vicinity of each density level, the gradation sensitivity (A gradation), which indicates the relation between the density and the amount of gradation change, can be derived. In other words, the gradation sensitivity (A gradation) indicates the amount of gradation change per unit of image density change amount at a specified image density. For example, when the density deviation ΔID at a certain image density is "0.01" and the gradation sensitivity (A gradation) of that image density is "1", the density deviation ΔID can be corrected to zero by increasing the gradation by one for the image area of the image density.

Next, the gradation correction amount calculator 206 executes the correction amount calculation processing of step H in FIG. 8 (S10). Specifically, the gradation correction amount for each gradation is calculated for each of the main-scanning direction areas (area 0 to area n) from the relation between the image density ID and the density deviation ΔID for each of the main-scanning direction areas (area 0 to area n) calculated in the density deviation calculation processing of steps B to D of FIG. 8 and the relation between the image density ID and the gradation sensitivity (4 gradation) calculated in the gradation sensitivity calculation processing of steps E to G of FIG. 8. Thus, it is possible to calculate an appropriate gradation correction amount for canceling the deviation between the target image density and the actual image density with respect to the input image data (input gradation) in each main-scanning direction area.

After the gradation correction amount of each area in the main scanning direction is obtained for each gradation of the band-shaped patterns as described above, the amount of gradation correction for each area in the main scanning direction is obtained by interpolation calculation for the gradations between the band-shaped patterns. The amount of gradation correction for each area in the main scanning direction for the gradations between the band-shaped patterns may be obtained as described below. In other words, based on the density unevenness data in the main scanning direction of multiple band-shaped patterns, the density unevenness in the main scanning direction for the gradations between band-shaped patterns is calculated using interpolation. Then, based on the density unevenness data calculated in the main scanning direction for the gradations between band-shaped patterns, the gradation correction amounts for each area along the main scanning direction, for all the gradations between the band-shaped patterns is obtained.

After determining the gradation correction amounts for each area along the main scanning direction for gradations 0 to 230, the target gradation for each gradation in each area along the main scanning direction is calculated from these correction amounts. Following this, a gradation correction table, as illustrated in FIG. 6, is created. The created gradation correction table is stored in the memory 210. The target gradation for each area along the main scanning direction at each gradation may not be used, but the gradation correction amount for each area along the main scanning direction at each gradation may be used. In this manner, once the gradation correction table is stored in the memory 210, the density adjustment control in the main scanning direction is completed.

The image processor 204 performs gradation correction based on the gradation correction table as illustrated in FIG. 6 stored in the memory 210. For example, the image processor 204 acquires a target gradation in a certain area along the main scanning direction of the image data from the gradation of the area and the gradation correction table. Then, the image processor 204 corrects the image data so as to achieve the target gradation. For example, when the target gradation is higher than the gradation of the image data, a prescribed number of white dots are converted into color dots from a dot pattern representing the gradation (image density) so as to obtain the target gradation, and the image data is corrected to perform the gradation correction. When the target gradation is lower than the gradation of the image data, a prescribed number of color dots are converted into white dots from a dot pattern representing the gradation (image density) so as to obtain the target gradation, and the image data is corrected to perform gradation correction.

According to the present embodiment, the shading correction is performed by the above-described processing, and the density unevenness in the main scanning direction can be reduced favorably for the image areas of high gradations (exceeding 230 gradations). In addition, for low gradations and middle gradations (0 to 230 gradations) in which density unevenness in the main scanning direction remains only by shading correction, density unevenness in the main scanning direction can be favorably reduced by performing the gradation correction described above. As a result, the density unevenness in the main scanning direction can be reduced at all the gradations of the low gradation, the middle gradation, and the high gradation.

In the present embodiment, gradation correction is not performed on an image with a high gradation exceeding 230. However, in some examples, gradation correction may be performed on all gradations. This allows for the correction of density unevenness in the main scanning direction, which could not be fully corrected by shading correction, through the use of gradation correction, particularly for higher gradations. For higher gradations, the variation in density unevenness is restrained by shading correction. Even with a fewer number of white dots and a limited number of dots that can be converted to colored dots, gradation correction can be performed on areas along the main scanning direction with a lighter density than the reference density, to match the reference image density.

In the present embodiment, the multiple band-shaped patterns (toner patterns) with different gradations used for density adjustment control in the main scanning direction are formed using the line screen for the default setting. When the gradation correction is performed with the gradation correction amount calculated from such band-shaped patterns, the density unevenness in the main scanning direction remains when an image is formed using a line screen different from the line screen for the default setting.

Figure 10:
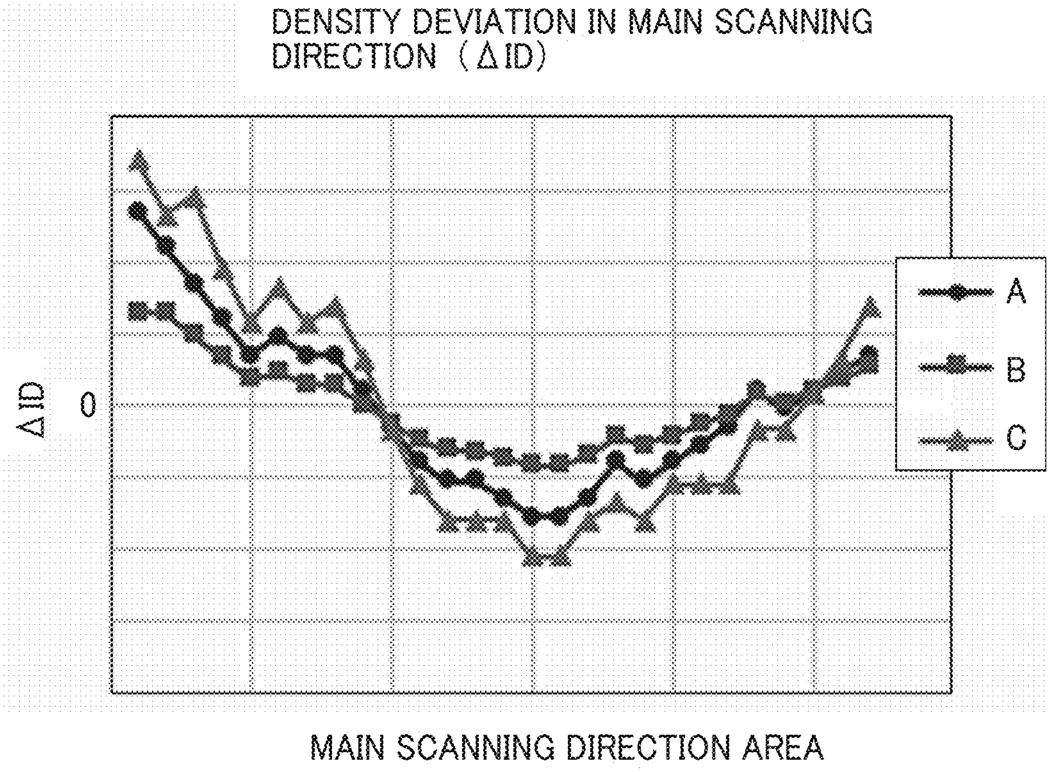
FIG. 10 is a graph of the density deviation for each area along the main scanning direction when band-shaped patterns of a specified gradation are formed using three different line screens.

FIG. 10 is a graph of the density deviation ΔID for each area along the main scanning direction, obtained from the density unevenness detection results of the band-shaped patterns for the line screens A to C, when band-shaped patterns of a specified gradation are formed using three different line screens A to C.

As presented in this graph, the density deviation ΔID in the main scanning direction varies depending on the number of screen lines used. For example, in FIG. 10, the density deviation ΔID tends to be smaller for the line screen B than for the line screen A of the default setting, and the density deviation ΔID tends to be larger for the line screen C than for the line screen A of the default setting.

Due to such a difference, applying the gradation correction amount calculated from the density unevenness data of band-shaped patterns formed with the line screen A for the default setting to the gradation correction process when forming images with different line screens B and C can result in overcorrection for line screen B and under-correction for line screen C. Thus, the correction accuracy of the density unevenness in the main scanning direction is deteriorated by the difference in the density deviation due to the difference in the number of screen lines.

In the present embodiment, as illustrated in FIG. 7, after calculating the density unevenness (density deviation ΔID) of the band-shaped patterns formed using the screen ruling A for the default setting (S6), the gradation correction amount calculated in the processing step S6 is corrected using correction amounts for the line screens B and C different from the default-setting line screen, and the corrected gradation correction amount is calculated as a gradation correction amount for the different line screens (S7 and S8).

For the correction amount for the other line screens B and C, for example, a correction coefficient for reducing the difference between the density deviation ΔID of the line screen A for the default setting and the density deviation ΔID of the other line screens B and C can be used. The correction coefficient is set so that the density deviation ΔID in the main scanning direction becomes smaller than the gradation correction amount before correction by the gradation correction amount after correction, and can be calculated from the density deviation ΔID of each line screen illustrated in FIG. 10, for example.

For example, one method for calculating the correction coefficient for line screen C is as follows: First, calculate the ratio of the density deviation ΔID for each area along the main scanning direction between the standard setting line screen A and line screen C, as represented by formula (1) below. Then, the average value of the ratio of the density deviation ΔID for each area along the main scanning direction is calculated, and the calculated average value is set as the correction coefficient of the number of screen lines C. The correction coefficient is calculated in advance by forming a band-shaped patterns of a prescribed gradation using each of the line screens A and C by, for example, a test and acquiring the density deviation ΔID (data presented in FIG. 10) for each area along the main scanning direction for the line screens A and C from the density unevenness detection results of the band-shaped patterns.

[Formula 1]

$$\Delta ID\text{ Ratio} = \left|\Delta ID(\text{Line screen } C)/\Delta ID(\text{Line screen } A)\right| \quad (1)$$

The correction coefficient of the line screen C obtained in this way is stored in the memory 210 in advance. In the present embodiment, in the density adjustment control in the main scanning direction, the gradation correction amount calculator 206 calculates the density unevenness (density deviation ΔID) of the band-shaped patterns using the number of screen lines A of the default setting (S6), and then reads the correction coefficient for another number of screen lines C from the memory 210 (S7). Thereafter, as represented by the following formula (2), the density unevenness (density deviation ΔID) calculated in the processing step S6 is multiplied by the read correction coefficient, thus calculating density unevenness (density deviation ΔID) for another line screen C (S8).

[Formula 2]

$$\Delta ID(\text{Line screen } C) = \text{Correction Coefficient} \times \Delta ID(\text{Line screen } A) \quad (2)$$

The density unevenness for the other line screen C calculated in this way is then used to calculate the gradation correction amount for the other line screen C in the correction amount calculation process (S10), following the same procedure as for the density unevenness associated with the default line screen A. In other words, the density unevenness data calculated for another line screen C is used, along with the gradation sensitivity (A gradation) determined during the gradation sensitivity calculation process, to calculate the gradation correction amounts for the gradations in all the areas along the main scanning direction (area 0 to area n) particularly for line screen C. Then, similarly to the density unevenness data for the default line screen A, a gradation correction table for another line screen C is created, and the created gradation correction table is stored in the memory 210.

The gradation correction table for another line screen C is used instead of the gradation correction table for the default line screen A when an image is formed using another line screen C, and the image processor 204 performs gradation correction.

Since the optimum correction coefficient is not uniform for all gradations, the correction coefficient is calculated for each gradation by the number of kinds of line screens and stored as a gradation correction table. Then, the density unevenness in the main scanning direction can be corrected with higher accuracy.

Further, the density unevenness in the main scanning direction may be large or small depending on the state of the image forming apparatus. However, the correction coefficients calculated for each line screen are attributable to the line screen itself and do not depend on factors such as the magnitude of density unevenness in the main scanning direction or trends in the density distribution.

Thus, there's no need to frequently recalculate the correction coefficients for each line screen. They can be pre-obtained as fixed parameters and stored in the memory 210.

Additionally, by forming a toner pattern and calculating the gradation correction amount each time a different line screen is selected, the density unevenness in the main scanning direction can be sufficiently reduced regardless of which line screen is selected. However, in this case, downtime for executing the process occurs. However, in the present embodiment, the correction coefficient for the line screen is stored in the memory 210 as a fixed parameter, and the downtime as described above does not occur.

The exemplary embodiments described above are one example and attain advantages below in the following aspects.

Aspect 1

The image forming apparatus (e.g., a printer 1000) includes an image former (e.g., the process unit 2 and the image processor 204) that forms a toner image based on image data, a density-unevenness detector (e.g., the density sensor 51) that detects density unevenness in a main scanning direction of a toner pattern (e.g., a band-shaped pattern) formed by the image former, and a correcting unit (e.g., the gradation correction amount calculator 206) that corrects an image-formation condition (e.g., a gradation correction table) of the image former based on a correction amount (e.g., a gradation correction amount) calculated from the density unevenness detected by the density-unevenness detector. The image former forms a toner image using a selected line screen. When a toner image is formed with another screen line (e.g., a line screen C) different from a line screen (e.g., a line screen A) used during formation of the toner pattern, the correction unit corrects the correction amount based on a correction amount (e.g., a correction coefficient) for said another screen line.

An image forming apparatus is known that perform halftone processing using a screen line number selected based on user instructions or input image data, and forms an image. For example, to enhance the reproduction of thin lines or small text, a line screen higher than the default setting may be chosen. In contrast, to improve dot stability, a line screen lower than the default setting might be selected. In such an image forming device, when calculating a correction amount to reduce density unevenness in the main scanning direction based on the detection results of density unevenness in the main scanning direction of the toner patterns and correcting the image formation conditions of the image forming unit based on the calculated correction amount, density unevenness in the main scanning direction could remain after the correction. Specifically, when the toner pattern is formed, the number of screen lines of the default setting is used. When the image forming conditions are corrected by the correction amount calculated from the toner pattern, the density unevenness in the main scanning direction remains when the toner image is formed by using the number of screen lines different from the number of screen lines for the default setting. In other words, when forming toner images using a screen line number different from that used in the creation of toner patterns, the image formation conditions corrected based on the correction amount derived from the said toner patterns are not sufficient to adequately reduce density unevenness in the main scanning direction.

In the present aspect, when forming toner images using a screen line number different from the one used during the creation of toner patterns, the correction amount derived from those toner patterns is modified by an adjustment value corresponding to the different screen line number. Thus, even when a toner image is formed using a screen line number different from the one used in forming toner patterns, density unevenness in the main scanning direction can be sufficiently reduced by forming images under conditions corrected with the modified correction amount.

Aspect 2

Aspect 2 is the image forming apparatus according to Aspect 1. The correction unit calculates the correction amount for each of multiple areas in the main scanning direction, which are at different positions in the main scanning direction, corrects the image-formation condition based on each calculated correction amount, and corrects each correction amount by a correction amount corresponding to the different number of screen lines when forming the toner image using the different number of screen lines.

This allows an appropriate reduction in the density unevenness in the main scanning direction.

Aspect 3

Aspect 3 is the image forming apparatus according to Aspect 2. The density-unevenness detector detects a density deviation ΔID for each of the multiple areas in the main scanning direction, which is a difference between a detection result of the image density for each of the multiple areas and a reference density (for example, a target image density of reference area data), as the density unevenness, and the correction unit calculates each correction amount for each of the multiple areas in the main scanning direction, from the density deviation for each of the multiple areas in the main scanning direction.

This allows an appropriate reduction in the density unevenness in the main scanning direction.

Aspect 4

Aspect 4 is the image forming apparatus according to Aspect 3, wherein the correction unit calculates the correction amount for each of the multiple areas in the main scanning direction from the density deviation for each of the multiple areas and gradation sensitivity (for example, A gradation) for each of the multiple areas in the main scanning direction.

This configuration appropriately reduces density unevenness in the main scanning direction by taking into account that the gradation correction amount per unit image density varies with differences in image density.

Aspect 5

In the image forming apparatus according to any one of Aspects 1 to 4, the correction unit selects a correction amount corresponding to an input gradation obtained from the image data from among correction amounts corresponding to multiple input gradations different from each other, and corrects the image forming condition.

This allows the correction of the density unevenness in the main scanning direction using optical correction coefficients that vary for each gradation, thus achieving more precise corrections.

Aspect 6

In any one of Aspect 1 to Aspect 5, the density-unevenness detector detects the density unevenness based on a detection result of image density for each of multiple areas in the main scanning direction having different main-scanning-direction positions in the toner pattern formed on a recording medium (for example, recording sheet).

In this configuration, density unevenness in the main scanning direction is detected from the toner patterns formed on the recording medium. This configuration allows more appropriate correction of the density unevenness in the main scanning direction as compared to when detecting the density unevenness in the main scanning direction from toner patterns before they are formed on the recording medium.

Aspect 7

An image forming apparatus includes an image former, a detector, and circuitry. The image former forms a toner pattern with a first line screen; and forms a toner image based on image data, with a second line screen. The detector detects density unevenness of the toner pattern, formed by the image former, in a main scanning direction. The circuitry is configured to calculate a first correction amount from the density unevenness detected by the detector; create a gradation correction table that reduces the density unevenness based on the first correction amount; and correct the first correction amount by a second correction amount corresponding to the second line screen, in a case where the first line screen is different from the second line screen.

Aspect 8

In the image forming apparatus according to Aspect 7, the circuitry is further configured to: calculate the first correction amount for each of multiple areas at different positions in the main scanning direction; correct the gradation correction table based on the first correction amount calculated for each of the multiple areas; and correct the first correction amount based on the second correction amount corresponding to the second line screen for each of the multiple areas, to cause the image former to form the toner image with the second line screen.

Aspect 9

In the image forming apparatus according to Aspect 8, the detector detects an image density of each of the multiple areas; and obtains a difference between the image density of each of the multiple areas and a reference density to obtain a density deviation for each of the multiple areas, as the density unevenness, and the circuitry calculates the first correction amount for each of the multiple areas, from the density deviation for each of the multiple areas.

Aspect 10

In the image forming apparatus according to Aspect 9, the circuitry calculates the first correction amount for each of the multiple areas based on both of the density deviation for each of the multiple areas and a gradation sensitivity for each of the multiple areas.

Aspect 11

In the image forming apparatus according to Aspect 1, the circuitry selects the first correction amount corresponding to an input gradation obtained from the image data, from multiple first correction amounts corresponding to multiple input gradations different from each other.

Aspect 12

In the image forming apparatus according to Aspect 7, the detector detects the density unevenness based on the image density for each of multiple areas at different positions in the main scanning direction in the toner pattern on a recording medium.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An image forming apparatus comprising:

an image former to:

form a toner pattern with a first line screen; and form a toner image based on image data, with a second line screen;

a detector to detect density unevenness of the toner pattern, formed by the image former, in a main scanning direction; and circuitry configured to:

calculate a first correction amount from the density unevenness detected by the detector;

create a gradation correction table that reduces the density unevenness based on the first correction amount; and correct the first correction amount by a second correction amount corresponding to the second line screen, in a case where the first line screen is different from the second line screen.

2. The image forming apparatus according to claim 1, wherein the circuitry is further configured to:

calculate the first correction amount for each of multiple areas at different positions in the main scanning direction;

correct the gradation correction table based on the first correction amount calculated for each of the multiple areas; and correct the first correction amount based on the second correction amount corresponding to the second line screen for each of the multiple areas, to cause the image former to form the toner image with the second line screen.

3. The image forming apparatus according to claim 2, wherein the detector:

detects an image density of each of the multiple areas; and obtains a difference between the image density of each of the multiple areas and a reference density to obtain a density deviation for each of the multiple areas, as the density unevenness, and the circuitry calculates the first correction amount for each of the multiple areas, from the density deviation for each of the multiple areas.

4. The image forming apparatus according to claim 3, wherein the circuitry calculates the first correction amount for each of the multiple areas based on both of:

the density deviation for each of the multiple areas; and a gradation sensitivity for each of the multiple areas.

5. The image forming apparatus according to claim 1, wherein the circuitry selects the first correction amount corresponding to an input gradation obtained from the image data, from multiple first correction amounts corresponding to multiple input gradations different from each other.

6. The image forming apparatus according to claim 1, wherein the detector detects the density unevenness based on image density for each of multiple areas at different positions in the main scanning direction in the toner pattern on a recording medium.

* * * * *